Sept. 20, 1938.                     W. J. MINKIEWITZ                     2,130,964
EGG SEPARATOR
Filed Aug. 20, 1937
*Fig. 1.*
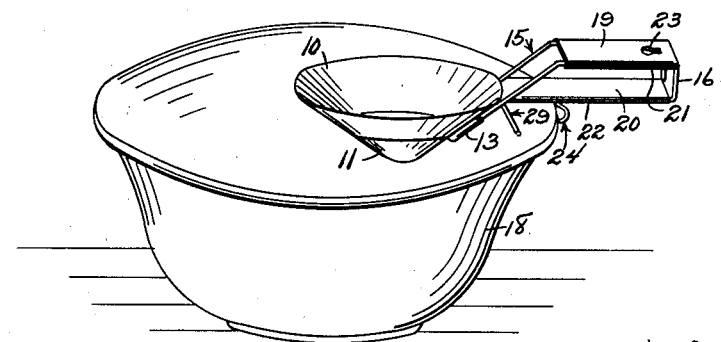
*Fig. 2.*       *Fig. 3.*
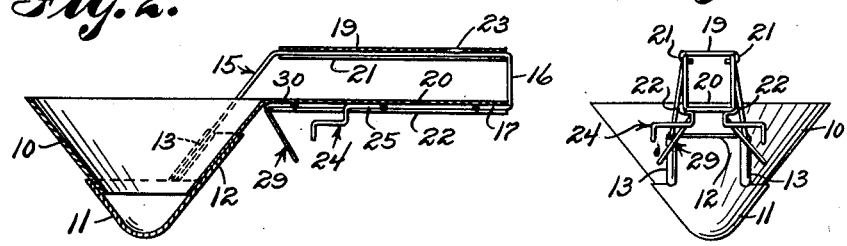   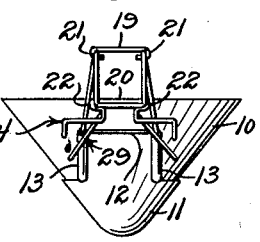
*Fig. 4.*       *Fig. 5.*
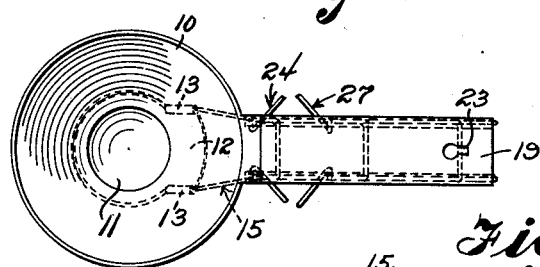   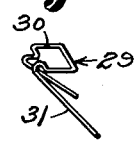
*Fig. 7.*
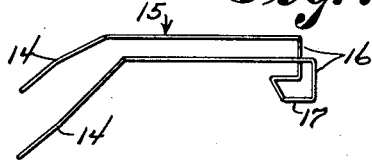
*Fig. 6.*
William J. Minkiewitz
INVENTOR
BY Victor J. Evans & Co.
ATTORNEYS Patented Sept. 20, 1938

2,130,964

UNITED STATES PATENT OFFICE 2,130,964

EGG SEPARATOR

William J. Minkiewitz, Salem, Oreg.

Application August 20, 1937, Serial No. 160,161

1 Claim. (Cl. 146—2)

This invention relates to egg separators and has for an object to provide a simple effective device for separating the whites and yolks of eggs.

Another object is to provide a device of this character having a cup and a funnel mounted to move toward and away from the cup and to be received within the cup, these two parts being carried by a novel spring grip which normally holds the parts assembled to form a vessel into which the egg may be dropped, there being novel means for supporting the device on a bowl into which the white of the egg may be quickly deposited by pressure upon the grip to move the cup away from the funnel.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims.

In the accompanying drawing forming part of this specification,

Figure 1 is a perspective view of an egg separator constructed in accordance with the invention supported upon a bowl to receive the whites of the eggs.

Figure 2 is a longitudinal sectional view through the egg separator.

Figure 3 is a rear elevation of the egg separator looking toward the handle or grip.

Figure 4 is a top plan view of the egg separator.

Figure 5 is a perspective view of one of the parts for supporting the device upon a bowl.

Figure 6 is a perspective view of a companion part for coacting with the part shown in Figure 5 in supporting the device upon a bowl.

Figure 7 is a perspective view of the frame of the handle.

Referring now to the drawing in which like characters of reference designate similar parts in the various views, 10 designates a funnel and 11 designates a cup, the small end of the funnel being received in the large end of the cup and the cup being rounded at the bottom and being of cubic capacity substantially equal to that of the yolk of an egg.

The cup is provided with an extension 12, best shown in Figure 3, having rolled edges to form tubes 13 which receive the ends 14 of a wire handle frame 15, best shown in Figure 7. The spaced sides of the handle frame remote from the cup are bent downwardly as shown at 16 and thence forwardly as shown at 17 while those portions of the sides adjacent the extension 12 are bent obliquely so that when the device is disposed on a bowl 18 into which the whites of the eggs are to be dropped, the handle will extend above and project beyond the rim of the bowl. Plates 19 and 20 are provided with rolled edges to form tubes 21 and 22 the former receiving the sides of the handle frame and the latter receiving the bent extremity 17 of the handle frame, as best shown in Figure 1. The plate 19 is provided with a keyhole slot 23 to receive a nail or other support for hanging up the device when not in use.

The handle frame is preferably formed of spring wire so that the operator may press the plates 19 and 20 toward each other by closing her hand upon the same to move the cup 11 downwardly from the funnel 10 and permit the white of an egg flowing out of the funnel over the rim of the cup while the yolk remains deposited in the cup. Any of the white which remains clinging to the bottom of the funnel will be cut off as the cup moves back into place on the funnel.

For supporting the device upon the rim of the bowl 18 a pair of wire frames shown best in Figures 5 and 6 are employed. The wire frame 24 is provided with a substantially oblong loop 25 adapted to be received in the tubes 22 of the bottom plate 20. Beyond the loop the sides of the frame are bent downwardly as shown at 26 and thence forwardly as shown at 27 and terminate in downwardly directed extremities 28 adapted to engage the outer surface of the bowl underneath the rim of the bowl.

The wire frame 29 is provided with a substantially rectangular loop 30 adapted to be received in the tube 22 of the bottom plate 20. The extremities of the frame are bent downwardly and directed obliquely rearwardly as shown at 31 in Figure 5 to engage the inner surface of the bowl and coact with the wire frame 24 in supporting the handle or grip of the device substantially horizontal and at the same time spacing the cup and the funnel from the inner surface of the bowl at the top of the bowl as shown best in Figure 1.

In operation the shells of the eggs are cracked and then the entire contents of the shell, including both the yolk and the white is dropped into the funnel 10. When the contents reach the cup 11 the yolk will be deposited in the cup while the white will collect in the funnel. By closing the hand upon the plates 19 and 20 the cup will be moved away from the funnel so that the white will escape over the edge of the cup and drop into the bowl while the yolk will remain intact in the cup.

From the above description it is thought that the construction and operation of the invention will be fully understood without further explanation.

What is claimed is:

An egg separator comprising a funnel, a cup on the bottom of the funnel, a spring grip having parallel members provided with terminal portions intersecting each other and one of the terminal portions being connected to the funnel while the other terminal portion is connected to the cup, the parallel portions of the members being adapted to be moved toward each other by closing of the operator's grip thereupon to move the cup away from the funnel, a rearwardly projecting member on the lowermost parallel member adapted to engage the inner surface of a bowl, and a forwardly extending member on said parallel member adapted to engage the outer surface of a bowl.

WILLIAM J. MINKIEWITZ.